United States Patent
Brueck et al.

(10) Patent No.: US 6,630,205 B2
(45) Date of Patent: Oct. 7, 2003

(54) SELF-CROSSLINKING COMPOSITIONS BASED ON FLUORINE-CONTAINING POLYCONDENSATES

(75) Inventors: Stefan Brueck, Saarbruecken (DE); Christoph Lesniak, Buchenberg (DE); Hermann Schirra, Saarbruecken (DE); Helmut Schmidt, Saarbruecken-Guedingen (DE)

(73) Assignee: Institut für Neue Materialien gem. GmbH, Saarbrücken (DE)

( * ) Notice: Subject to any disclaimer, the term of this patent is extended or adjusted under 35 U.S.C. 154(b) by 0 days.

(21) Appl. No.: 10/148,520

(22) PCT Filed: Dec. 1, 2000

(86) PCT No.: PCT/EP00/12119

§ 371 (c)(1), (2), (4) Date: May 31, 2002

(87) PCT Pub. No.: WO01/40394

PCT Pub. Date: Jun. 7, 2001

(65) Prior Publication Data

US 2002/0193504 A1 Dec. 19, 2002

(30) Foreign Application Priority Data

Dec. 3, 1999 (DE) .......................... 199 58 336

(51) Int. Cl.⁷ .................. B05D 3/02; C09D 7/14; C09D 183/05
(52) U.S. Cl. ........................................ 427/387
(58) Field of Search ................................ 427/387

(56) References Cited

U.S. PATENT DOCUMENTS 5,547,711 A * 8/1996 Kirchmeyer et al. ........ 427/386
5,644,014 A * 7/1997 Schmidt et al. .............. 528/43

FOREIGN PATENT DOCUMENTS

| DE | 19544763 | * | 6/1997 |
| DE | 19649955 | * | 6/1998 |
| WO | WO 92 / 21729 | * | 12/1992 |
| WO | WO 99 / 52964 | * | 10/1999 |

* cited by examiner

Primary Examiner—Erma Cameron
(74) Attorney, Agent, or Firm—Heller Ehrman White & McAuliffe LLP

(57) ABSTRACT

The invention relates to a method for coating a substrate according to which a self-crosslinking coating composition is produced on the basis of a) at least one hydrolysable silane with at least one nonhydrolysable substituent, said silane having one or more electrophilic groups X on at least one nonhydrolysable substitutent, b) at least one hydrolysable silane with at least one nonhydrolysable substituent, said silane having one or more nucleophilic groups Y on at least one nonhydrolysable substituent, c) at least one hydrolysable silane with at least one nonhydrolysable carbonic group that has an average of 2 to 30 fluorine atoms that are bound to one or more aliphatic carbon atoms that are separated from the silicon atom by at least two atoms. The silanes (a), (b) and/or (c) are optionally precondensed and either the silanes (a) may be completely or partially replaced by organic compounds with at least two groups X or the silanes (b) may be completely or partially replaced by organic compounds with at least two groups Y. The self-crosslinking coating composition is then applied to a substrate and allowed to cure at ambient temperature (below 40° C.) to form a coating.

17 Claims, No Drawings

SELF-CROSSLINKING COMPOSITIONS BASED ON FLUORINE-CONTAINING POLYCONDENSATES

The invention relates to a self-crosslinking coating system based on fluorine containing polycondensates, to a method for coating substrates with this coating composition, and to coated substrates thereby obtainable.

Thin, in many cases almost monomolecular, layers and impregnations of silanes and siloxanes containing perfluorinated side groups are used in order to give the surface of substrates water and oil repellency. However, the impregnations or layers, a few nanometers thick, do not provide the substrate surface with durable protection in the face of mechanical or chemical attack.

EP 0 587 667 (corresponding to DE 41 18 184) describes durable coating compositions based on polycondensates of one or more hydrolysable compounds M from main groups III to V and transition groups II to IV of the periodic table of the elements, at least some of these compounds being hydrolysable compounds containing perfluorinated side groups, especially hydrolysable silanes containing perfluorinated groups. These coating compositions can be cured but it is necessary to carry out crosslinking on the substrate by means of photochemical polymerization or of thermal polymerization at a temperature of at least 50° C. As a result, their use is technically complex, since appropriate curing equipment is required. For large-surface-area applications in particular, such as on the facades of buildings, for example, this represents a considerable restriction.

It is an object of the present invention to provide a method for coating substrates which provides coatings having antistick properties without a special curing step and without specific curing equipment. These coatings should nevertheless be scratch resistant and durable with respect, for example, to chemical or mechanical attack. It is further intended that the coating material should be provided in an easy-to-handle and storage-stable form. This object is achieved in accordance with the invention by a method for coating a substrate by preparing a self-crosslinking coating composition based on a) at least one hydrolysable silane containing at least one nonhydrolysable substituent, the silane containing one or more electrophilic groups X on at least one nonhydrolysable substituent, b) at least one hydrolysable silane containing at least one nonhydrolysable substituent, the silane containing one or more nucleophilic groups Y on at least one nonhydrolysable substituent, and c) at least one hydrolysable silane containing at least one nonhydrolysable carbonic group having on average from 2 to 30 fluorine atoms attached to one or more aliphatic carbon atoms separated by at least two atoms from the silicon atom, the silanes (a), (b) and/or (c) having undergone prior condensation if desired and it being possible either for the silanes (a) to be replaced in whole or in part by organic compounds containing at least two groups X or for the silanes (b) to be replaced in whole or in part by organic compounds containing at least two groups Y, applying it to a substrate and curing it at ambient temperature (below 40° C.) to form a coating.

The coating composition used in the method of the invention may be obtained, for example, in the form of an easy-to-handle, storage-stable two-component coating system. This two-component coating system is characterized by a component (A) comprising at least one—optionally precondensed—hydrolysable silane (a) containing at least one nonhydrolysable substituent, the silane (a) having one or more electrophilic groups X on at least one nonhydrolysable substituent, and a component (B) comprising at least one—optionally precondensed—hydrolysable silane (b) containing at least one nonhydrolysable substituent, the silane (b) containing one or more nucleophilic groups Y on at least one nonhydrolysable substituent, it being possible either for the silanes (a) to be replaced in whole or in part by organic compounds containing at least two groups X or for the silanes (b) to be replaced in whole or in part by organic compounds containing at least two groups Y, and component (A) and/or (B) further comprising a hydrolysable silane (c) containing at least one nonhydrolysable carbonic group having on average 2 to 30 fluorine atoms attached to one or more aliphatic carbon atoms separated by at least two atoms from the silicon atom.

In one specific embodiment the coating composition of the invention further comprises nanoscale inorganic particulate solids which may have been surface modified.

Specific examples of the electrophilic group X are the epoxide, anhydride, acid halide and isocyanate groups.

Specific examples of the nucleophilic group Y are the amino group and the hydroxyl group.

Pairings which have proven to be particularly suitable for ambient temperature self-crosslinking include epoxy/amino and isocyanate/hydroxyl.

In accordance with the invention, self-curing, highly scratch-resistant coatings of low surface energy are obtained which adhere particularly well to the coated substrate without the need for a special curing step. The resulting coatings possess excellent antistick and easy-to-clean properties.

To prepare the coating composition the method of the invention uses as component a) at least one hydrolysable silane containing at least one nonhydrolysable substituent, the silane containing one or more electrophilic groups X on at least one nonhydrolysable substituent.

This component a) comprises a silicon compound possessing 1 to 3, preferably 2 or 3, with particular preference 3, hydrolysable radicals and 1, 2 or 3, preferably 1 or 2, especially one, nonhydrolysable radical(s). At least one of the nonhydrolysable radicals possesses at least one electrophilic group X.

Examples of hydrolysable groups, which may be identical to or different from one another, are hydrogen, halogen (F, Cl, Br or I, especially Cl and Br), alkoxy (e.g. $C_{1-6}$ alkoxy, especially $C_{1-4}$ alkoxy, such as methoxy, ethoxy, n-propoxy, isopropoxy, n-butoxy, isobutoxy, sec-butoxy, tert-butoxy), aryloxy (preferably $C_{6-10}$ aryloxy, such as phenoxy), acyloxy (e.g. $C_{1-6}$ acyloxy, especially $C_{1-4}$ acyloxy, such as acetoxy or propionyloxy) and alkylcarbonyl (preferably $C_{2-7}$ alkylcarbonyl, such as acetyl). Preferred hydrolysable radicals are halogen, alkoxy groups and acyloxy groups. Particularly preferred hydrolysable radicals are alkoxy groups, especially methoxy and ethoxy.

Examples of nonhydrolysable radicals containing no group X are alkyl (preferably $C_{1-8}$ alkyl, such as methyl, ethyl, n-propyl, isopropyl, n-butyl, s-butyl and tert-butyl, pentyl, hexyl, octyl or cyclohexyl), alkenyl (preferably $C_{2-6}$ alkenyl, such as vinyl, 1-propenyl, 2-propenyl and butenyl), alkynyl (preferably $C_{2-6}$ alkynyl, such as acetylenyl and propargyl) and aryl (preferably $C_{6-10}$ aryl, such as phenyl and naphthyl). The radicals may if desired contain one or more customary substituents, such as halogen or alkoxy, or functional groups not included among electrophilic groups X, examples being (meth)acryloyl groups and (meth)acryloyloxy groups.

Suitable electrophilic groups X are known to the person skilled in the art. Preferred examples include epoxy, anhydride, acid halide and isocyanate groups. Where two or more electrophilic groups X are present in the silane or where different silanes containing electrophilic groups X are used, X may have the same meaning or a different meaning.

Examples of nonhydrolysable radicals containing an epoxy group are in particular those which possess a glycidyl or glycidyloxy group. Specific examples of silanes of component a) which contain an epoxy group and can be used in accordance with the invention can be found, for example, in EP 0 195 493, whose entire disclosure is incorporated into the present specification by reference.

The nonhydrolysable radicals containing acid halide groups or acid anhydride groups X may, for example, be radicals deriving from carboxylic anhydrides or carbonyl halides. The halides in question may be the acid chloride, bromide or iodide, the acid chlorides being preferred. They may be anhydrides or halides of straight-chain or branched, aliphatic, cycloaliphatic or aromatic carboxylic acids, e.g. anhydrides and halides of ($C_{1-8}$ alkyl)carboxylic acids, such as acetic acid, propionic acid, butyric acid and malonic acid, ($C_{2-8}$ alkenyl)carboxylic acids, such as maleic acid, or ($C_{6-25}$ aryl)carboxylic acids, such as phthalic acid. Specific examples are propionyl chloride, acetyl chloride, sulphonyl chloride, succinic anhydride, maleic anhydride, phthalic anhydride and acetic anhydride.

The electrophilic group X may be attached directly to the silane, but is preferably attached to the silane via a linking group. Further and specific examples of hydrolysable and nonhydrolysable groups and of silanes which can be used are set out hereinbelow.

Hydrolysable silanes particularly preferred in accordance with the invention and containing an electrophilic group X are those of the general formula (I):

$$Z_3SiR \qquad (I)$$

in which the radicals Z, identical to or different from one another (preferably identical), stand for a hydrolysable group and are, for example, a halogen (F, Cl, Br and I, especially Cl and Br), alkoxy (e.g. $C_{1-6}$ alkoxy, especially $C_{1-4}$ alkoxy, such as methoxy, ethoxy, n-propoxy, isopropoxy, n-butoxy, isobutoxy, sec-butoxy and tert-butoxy), aryloxy (especially $C_{6-10}$ aryloxy, e.g. phenoxy), acyloxy (e.g. $C_{1-6}$ acyloxy, especially $C_{1-4}$ acyloxy, such as acetoxy and propionyloxy) and alkylcarbonyl (e.g. acetyl), and R is a nonhydrolysable group containing at least one electrophilic group X. Particularly preferred hydrolysable groups Z are $C_{1-4}$ alkoxy and especially methoxy and ethoxy.

The nonhydrolysable group R may be, for example, a group R"X, in which X is the electrophilic group and R" is a bridging group which connects the group X to the silicon. The group R" may be an alkylene, alkenylene or arylene bridging group, which may be interrupted by oxygen groups or —NH— groups. The bridging groups mentioned derive, for example, from alkyl radicals (preferably $C_{1-20}$ alkyl, such as methyl, ethyl, n-propyl, isopropyl, n-butyl, s-butyl and tert-butyl, pentyl, hexyl, octyl or cyclohexyl), alkenyl radicals (preferably $C_{2-6}$ alkenyl, such as vinyl, 1-propenyl, 2-propenyl and butenyl) and aryl radicals (preferably $C_{6-10}$ aryl, such as phenyl and naphthyl). The radicals may if desired contain one or more customary substituents, such as halogen or alkoxy. The group X may be an epoxy, acid anhydride, acid halide or isocyanate group. The epoxy group is preferred. It is of course also possible for more than one electrophilic group X, identical or different, to be attached to the bridging group R".

A preferred nonhydrolysable radical R containing an epoxy group is a glycidyl-, or glycidyloxy-($C_{1-20}$) alkylene radical. Specific examples thereof include in particular β-glycidyloxyethyl, γ-glycidyloxypropyl, δ-glycidyloxybutyl, ε-glycidyloxypentyl, ω-glycidyloxyhexyl, and 2-(3,4-epoxycyclohexyl)ethyl. Owing to their ready availability, γ-glycidyloxypropyltrimethoxysilane (referred to for short as GPTS hereinbelow) and γ-glycidyloxypropyltriethoxysilane (referred to for short below as GPTES) are used with particular preference in accordance with the invention.

Examples of suitable isocyanatosilanes are 3-isocyanatopropyltriethoxysilane and 3-isocyanato-propyldimethylchlorosilane. Examples of suitable silanes containing an acid anhydride group are

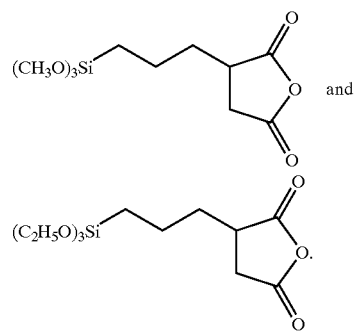

The number and nature of the hydrolysable groups and of the nonhydrolysable groups for the hydrolysable silanes containing a nucleophilic group Y correspond to those indicated above for the hydrolysable groups containing an electrophilic group X. Mutatis mutandis, reference may therefore be made to the above explanations.

Examples of nucleophilic groups Y are amino groups and the OH groups. Examples of nonhydrolysable radicals containing amine groups derive, for example, from primary, secondary or tertiary amines. The group may be, for example, an —$NH_2$, —$NHR^2$ or —$NR^2_2$, where $R^2$ can be a group, for example, that was mentioned above for R.

Preferred silanes containing a nucleophilic group are those of the general formula (II):

$$Z_3SiR' \qquad (II)$$

in which the radicals Z are defined as in the case of the general formula (I) above and R' stands for a nonhydrolysable, Si-bonded radical which contains at least one nucleophilic group Y. The nonhydrolysable group R' may, for example, be a group R"Y, where Y is the functional group and R" is a bridging group which connects the group Y to the silicon. R" is defined as above in the case of the general formula (I). Y is, for example, an amino group or a hydroxyl group. It is of course also possible for more than one nucleophilic group Y, identical or different, to be attached to the bridging group R".

Specific examples of such silanes containing an amino group are 3-aminopropyltrimethoxysilane (APTS), 3-aminopropyltriethoxysilane, N-(2-aminoethyl)-3-aminopropyltrimethoxysilane, and N-[N'-(2'-aminoethyl)-2-aminoethyl]-3-aminopropyltrimethoxysilane. A specific example of the silane containing hydroxyl group is hydroxymethyltriethoxysilane. Specific examples of silanes containing amino group and hydroxyl group are bis(hydroxyethyl)-3-aminopropyltriethoxysilane and N-hydroxyethyl-N-methylaminopropyltriethoxysilane.

The molar ratio of the electrophilic groups X to the nucleophilic groups Y in the coating composition of the invention is preferably in the range from 5:1 to 1:1, more preferably from 3:1 to 2:1.

Either the hydrolysable silane compounds containing the electrophilic group X can be replaced in whole or in part by organic compounds containing at least two electrophilic groups X or the hydrolysable silane compounds containing the nucleophilic group Y can be replaced in whole or in part by organic compounds containing at least two electrophilic groups Y. The groups X or Y that are present in the organic compounds are the same groups specified above in connection with the corresponding hydrolysable silane compounds. It is not possible for both hydrolysable silane compounds to be completely replaced by corresponding organic compounds.

Where an organic compound is used, the electrophilic or nucleophilic groups it contains are to be taken into account when setting the preferred molar ratio between component a) and component b); in other words, in that case the preferred molar ratio of component a) to component b) is based on the molar amount of electrophilic group X present to the molar amount of nucleophilic group Y.

The aforementioned organic compounds may comprise organic monomers, oligomers or polymers containing at least two electrophilic or nucleophilic groups, or mixtures thereof. Use may be made of any compound which is known from the prior art and is suitable for these purposes. The compounds in question comprise, for example, aliphatic, cycloaliphatic or aromatic compounds.

Specific examples of organic compounds containing at least two epoxide groups are 3,4-epoxycyclohexylmethyl 3,4-epoxycyclohexanecarboxylate, bis(3,4-epoxycyclohexyl) adipate, 1,4-butanediol glycidyl ether, cyclohexanedimethanol diglycidyl ether, glycerol triglycidyl ether, neopentyl glycol diglycidyl ether, pentaerythritol polyglycidyl ether, 2-ethylhexyl glycidyl ether, 1,6-hexanediol diglycidyl ether, propylene glycol diglycidyl ether, polypropylene glycol diglycidyl ether, bisphenol A diglycidyl ether, bisphenol F diglycidyl ether, epoxy resins based on bisphenol A, epoxy resins based on bisphenol F, and epoxy resins based on bisphenol A/F.

Specific examples of organic compounds containing at least two amino groups are 1,3-diaminopentane, 1,5-diamino-2-methylpentane, 1,4-diaminocyclohexane, 1,6-diaminohexane, diethylenediamine, triethylenetetramine or isophoronediamine. Specific examples of organic compounds containing at least two acid chloride groups are malonyl dichloride, succinyl chloride and adipyl dichloride. It is of course also possible to use organic compounds which carry different electrophilic or different nucleophilic groups.

The coating composition used in the method of the invention further comprises at least one hydrolysable silane (c) containing at least one nonhydrolysable carbonic group having on average from 2 to 30 fluorine atoms attached to one or more aliphatic carbon atoms separated by at least two atoms from the silicon atom. For simplification, these silanes are sometimes referred to below as fluorosilanes.

The number and nature of the hydrolysable groups and of the nonhydrolysable groups for the hydrolysable silanes containing a fluorinated group correspond, apart from the nonhydrolysable fluorinated group, to those specified above for the hydrolysable groups containing an electrophilic or nucleophilic group. To that extent, reference may be made, mutatis mutandis, to the explanations above. Specific examples of fluorosilanes which can be used in accordance with the invention can be taken from EP 0 587 667, hereby incorporated by reference.

The nonhydrolysable group containing F substituents R''' in the fluorosilane contains on average from 2 to 30, preferably from 5 to 30, fluorine atoms attached to one or more aliphatic (including cycloaliphatic) carbon atoms separated by at least two atoms from the silicon. The groups R''' contain preferably on average from 5 to 25 and in particular from 8 to 18 fluorine atoms attached to aliphatic carbon atoms, not counting those fluorine atoms which may be attached otherwise, for example to aromatic carbon atoms (in the case of $C_6F_4$, for example). The fluoric group R''' may also comprise a chelate ligand. It is also possible for one or more fluorine atoms to be located on a carbon atom which is the starting point for a double or triple bond. Since the group R''' is required to contain on average only 2 corresponding fluorine atoms, it is also possible to use groups R''' which possess only 1 fluorine atom, provided there are at the same time sufficient groups R''' present containing more than 2 fluorine atoms.

Preferred silanes containing a fluorinated group are those of the general formula (III):

$$Z_3SiR''' \tag{III}$$

in which the radicals Z are defined as above in the case of the general formula (I) and R''' is, for example, a group as defined above or a group set out below.

Specific examples of fluorosilanes are $C_2F_5$—$CH_2CH_2$—$SiZ_3$, n-$C_6F_{13}$—$CH_2CH_2$—$SiZ_3$, n-$C_8F_{17}$—$CH_2CH_2$—$SiZ_3$, n-$C_{10}F_{21}$—$CH_2CH_2$—$SiZ_3$ (where Z=$OCH_3$, $OC_2H_5$ or Cl); i-$C_3F_7O$—$CH_2CH_2CH_2$—$SiCl_2(CH_3)$, n-$C_6F_{13}$—$CH_2CH_2$—$SiCl_2(CH_3)$ and n-$C_6F_{13}$—$CH_2CH_2$—$SiCl(CH_3)_2$ The fluorosilane (c) is used, for example, in an amount of from 0.005 to 0.05 mol per mole of component (a). Preferred amounts are in the range from 0.005 to 0.03 and in particular from 0.008 to 0.02 mol per mole of component (a).

The nanoscale particulate solids (d) comprise particles having an average size (average particle diameter) of not more than 1000 nm, preferably not more than 200 nm, more preferably not more than 100 nm, and in particular not more than 70 nm. Particularly preferred particle sizes are in the range from 1 to 100 nm, preferably from 2 to 50 nm and with particular preference from 5 to 40 nm.

The nanoscale (inorganic) particulate solids may be composed of any desired materials but are preferably composed of metals and in particular of metal compounds such as, for example, (optionally hydrated) oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as, for example, sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (e.g. indium tin oxides (ITO) and those with perovskite structure such as $BaTiO_3$ and $PbTiO_3$).

The nanoscale inorganic particulate solids used preferably comprise an oxide or oxide hydrate of Si or Al and also transition metals, preferably Ti, Zr and Ce, and mixtures thereof. Examples of such are nanoscale particles of $SiO_2$, $TiO_2$, $ZrO_2$, ZnO, $SnO_2$ and $Al_2O_3$ (in all modifications, especially as boehmite, AlO(OH)) and also mixtures thereof It is particularly preferred to use nanoscale $SiO_2$ particles. For this purpose it is also possible, for example, to use commercial silica products, e.g. silica sols, such as the Levasil® silica sols from Bayer AG, or pyrogenic silicas, such as the Aerosil® products from Degussa. The particulate materials are available commercially in the form of powders and sols.

The nanoscale particulate solids may be used in this form or in the form of surface-modified particles. Nanoscale inorganic particulate solids provided with organic surface groups may be prepared in principle by two different routes: firstly by surface modification of pre-manufactured nanoscale inorganic particulate solids, and secondly by preparing the inorganic nanoscale particulate solids using one or more compounds that are suitable for surface modification.

Where surface modification of pre-manufactured nanoscale particles is carried out, compounds suitable for this purpose are all (preferably low molecular mass) compounds which possess one or more groups which are able to react or at least interact with (functional) groups (such as OH groups in the case of oxides, for example) present on the surface of the nanoscale particulate solids. Accordingly, the corresponding compounds may, for example, form both covalent and ionic (saltlike) or coordinative (complex) bonds to the surface of the nanoscale particulate solids, while pure interactions that may be mentioned include, by way of example, dipole—dipole interactions, hydrogen bonding and van der Waals interactions. Preference is given to the formation of covalent and/or coordinative bonds. Specific examples of organic compounds which can be used for surface modification of the nanoscale inorganic particulate solids include, for example, carboxylic acids, β-dicarbonyl compounds (for example β-diketones or β-carbonylcarboxylic acids), alcohols, amines, epoxides and the like.

With particular preference in accordance with the invention, and especially in the case of oxide particles, surface modification is carried out using hydrolytically condensable silanes containing at least (and preferably) one nonhydrolysable radical. Examples of compounds suitable for this purpose are the aforementioned hydrolysable silanes of components a) to c). Where, for example, at least some of the hydrolysable silanes of components a) and/or b) are used for surface modification of the nanoscale inorganic particulate solids, and these surface-modified particles are used for the coating composition, the resulting coatings are extremely advantageous (scratch resistance). Alternatively, the fluorosilanes may be used for surface modification. By using particulate solids with surface modification of this kind in the coating composition it is possible to produce coatings having fluorine concentration gradients.

Where the nanoscale inorganic particulate solids are themselves prepared using one or more compounds which possess addition-polymerizable/polycondensable groups, there is no need for subsequent surface modification (although this is of course possible as an additional measure).

The variation in the nanoscale particles is generally accompanied by a variation in the refractive index and in the chemical resistance of the corresponding materials. For instance, the complete or partial replacement of $SiO_2$ particles by $ZrO_2$ and/or $TiO_2$ particles leads to materials having higher refractive indices, the refractive index being, in accordance with the Lorenz-Lorentz equation, an additive product of the volume of the individual components. Replacing some or all of the $SiO_2$ particles by boehmite, $ZrO_2$ and/or $TiO_2$ particles leads to materials of high alkali resistance.

The nanoscale inorganic particulate solids are used in the coating composition in, for example, an amount of from 0.20 to 2.00 mol per mol of component (a). Preferred amounts are in the range from 0.7 to 1.7 and in particular from 1.0 to 1.4 mol per mol of component (a).

It is also possible to add further hydrolysable compounds (e) of elements from the group consisting of Si, Ti, Zr, Al, B, Sn and V to the coating composition. They are preferably hydrolysed with the hydrolysable silane compounds of component (a). Compound (e) comprises a compound of Si, Ti, Zr, Al, B, Sn or V of the general formula $R_xM^{4+}R'_{4-x}$ or $R_xM^{3+}R'_{3-x}$, where M is a) $Si^{4+}$, $Ti^{4+}$, $Zr^{4+}$ or $Sn^{4+}$ or b) $Al^{3+}$, $B^{3+}$ or $(VO)^{3+}$, R is a hydrolysable radical, R' is a nonhydrolysable radical and x can be from 1 to 4 in the case of tetravalent metal atoms (case a) and from 1 to 3 in the case of trivalent metal atoms (case b). Where two or more radicals R and/or R' are present in one compound (e), they may each be identical or different. x is preferably greater than 1, i.e. the compound (e) has at least one, preferably two or more, hydrolysable radical(s).

Examples of the hydrolysable radicals are halogen (F, Cl, Br and I, especially Cl and Br), alkoxy (especially $C_{1-4}$ alkoxy, such as methoxy, ethoxy, n-propoxy, xy, n-butoxy, isobutoxy, sec-butoxy or tert-butoxy), acyloxy (especially $C_{1-4}$ acyloxy, such as acetoxy and propionyloxy). Particularly preferred hydrolysable radicals are alkoxy groups, especially methoxy and ethoxy.

Examples of nonhydrolysable radicals are alkyl groups (especially $C_{1-4}$ alkyl such as methyl, ethyl, propyl and butyl) which may where appropriate contain one or more substituents such as halogen and alkoxy. Methacryloyl- and methacryloyloxypropyl-radicals may also be used in this context. As is evident, these compounds (e) (especially the silicon compounds) may also possess nonhydrolysable radicals which contain a C—C double or triple bond.

Furthermore, the coating composition used in accordance with the invention may comprise customary additives, such as solvents, dissolved dyes, colour pigments, levelling agents, rheological additives, UV stabilizers and polymerization catalysts.

In order to set a simple mixing ratio and to adjust the rheological properties of the components it is possible where appropriate to add inert solvents after the lower alcohols have been distilled off. These solvents are preferably glycol ethers and alcohols which are liquid at room temperature. Particularly preferred solvents are $C_{1-8}$ alcohols, especially 1-butanol, as low boilers, and glycol ethers, especially 1-butoxyethanol, as high boilers.

Application to the substrate is carried out by standard coating techniques such as, for example, dipping, spreading, brushing, knife coating, rolling, spraying, curtain coating and spin coating. It is preferred to apply a wet film of from 10 to 100 μm, more preferably from 20 to 70 μm and in particular from 30 to 50 μm. The thickness of the crosslinked coat should be from 0.5 to 50 μm, preferably from 1 to 20 μm and in particular from 2 to 10 μm. Self-crosslinking generally takes place at an ambient temperature of 20° C. within 3 h to dryness state 5 and within 48 h to dryness state 6. If desired, of course, more rapid drying can be achieved by means of an increased temperature.

There is no restriction on the selection of the substrate materials for coating. The coating compositions are suitable with preference for coating wood, textiles, paper, stoneware, metals, glass, ceramics, plastics and alcohol-resistant organic paints, inks and plaster. The compositions are especially suitable for coating painted substrates, especially substrates with a 2K PU topcoat, metals or painted metal surfaces, and natural or artificial stone. Automobile body topcoats, building facades and facade elements in particular can be coated using the coating compositions obtained in accordance with the invention. Further fields of use include medical devices, medical engineering (dental material), outer surfaces of vehicles (also windscreens and mirrors), aircraft, motors and propellers, food preparation apparatus, milk production and processing, and pipes.

The articles coated in accordance with the invention acquire a permanent antiadhesive surface, and graffiti applied to this surface or posters stuck to it with paste are easy and simple to remove. It has been found that with the coating composition of the invention, especially when the abovementioned preferred proportions between the components are maintained, coatings are obtained which have good adhesion, abrasion resistance and scratch resistance and also water, oil and paint repellency properties. The self-crosslinking coats are colourlessly transparent, resistant to scratching, and possess a surface energy of less than 20 mJ/m$^2$.

The coating composition may be obtained in particular by a method in which first of all two separate storable components (A) and (B) are prepared which then, by mixing, give the ready-to-apply coating composition. For ease of handling, the concentrations of the two components may be adjusted using one or more solvents so as to give, on mixing, simple (whole-number) mass proportions such as, for example, 3 parts (a) to 1 part (b). The pot life of the mixed components (A) and (B) is determined by the nature and proportion of the hydrolysable silane compounds of components a) and b) and of the amount of solvent used, and is preferably from 1.5 to 5 h.

The hydrolysable silanes of components a) to c) may be used as monomers or in partly condensed form. In one preferred embodiment one of components a) and b), preferably component a), is used with the fluorosilane in cocondensed form. In one preferred embodiment component (A) of the two-component coating system comprises such a cocondensate. For this purpose the fluorosilane is preferably added to the prehydrolysate of the silicon compound of component a) and cohydrolysed. This approach leads to coatings having a strong accumulation of the fluorosilane at the coat surface (strong fluorine gradient). In order to set a lower fluorine gradient, the fluorosilane may also be prehydrolysed separately or together with the hydrolysable compounds (e) or 10% by weight of the particulate material (d) and then added to the prehydrolysate of the silicon compound (a). Where the fluorosilane is of limited solubility in the prehydrolysate of component a), alcohols can be added as solubilizers. The reaction mixture is stirred thoroughly at room temperature until the added fluorosilane has been hydrolysed.

The examples which follow illustrate the invention.

EXAMPLE 1

Preparation of Component (A)

A silane compound (component a) is prehydrolysed in aqueous solution, preferably at room temperature and with the use, if desired, of an acidic catalyst, using preferably about 2.5 mol of water per mole of hydrolysable group. By room temperature is meant from 20 to 23° C. As catalyst for the prehydrolysis it is preferred to use 0.1 N hydrochloric acid. Hydrolysis is generally continued until about a third of the water introduced with the hydrochloric acid has been consumed. The residual water content during hydrolysis can be monitored using Karl-Fischer titration.

Typical values using 2.5 mol of GTPS as silane compound of component a) are a reaction time of 4 h, a residual water content of 25% by weight (initial FIG. 36% by weight) and a typical degree of Si condensation, according to $^{29}$Si NMR, of from 25 to 30% (from 25 to 28% T$^0$, from 60 to 65% T$^1$ and from 8 to 11% T$^2$ Si species). Under these conditions there is no opening of the epoxide ring to form the glycol ($^{13}$C NMR).

A fluorosilane component may be added for cocondensation. With 1 mol of GPTS prehydrolysate and 0.009 mol of 1H,1H,2H,2H-perfluorooctyl-triethoxysilane as the fluorosilane, suitable conditions are a reaction time of 4 h with addition of 130 g of methanol per g of (B) as solubilizer. Further typical figures are a residual water content of 9% by weight and a typical degree of Si condensation, according to $^{29}$Si NMR, of from 34 to 38% (from 10 to 15% T$^0$, from 62 to 67% T$^1$ and from 20 to 24% T$^2$ Si species). The surface tension of the sol is from 25 to 27 mN/m at 25° C. (as measured by the Wilhelmy method).

Lower alcohols formed during the hydrolysis, and any added solubilizers, are removed by means of a subsequent vacuum distillation, the degree of condensation being increased to an extent such that the crude component (A) is virtually free from uncondensed Si species. If an azeotrope has been distilled off in the distillation, it is preferred to replace the amount of water lost through the distillation. Typical values from the above example with a vacuum distillation at a bath temperature of 40° C. and a final pressure of 75 mbar are from 22 to 29% by weight yield of crude condensate (a) having a residual water content of from 12 to 14% by weight and a degree of Si condensation of from 60 to 64% (from 0 to 2% T$^0$, from 26 to 32% T$^1$, from 52 to 66% T$^2$ and from 11 to 19% T$^3$ Si species). Replacing the water loss typically requires from 0.25 to 0.30 g of water per g of distillation residue.

Preparation of Component (B)

A silane compound (component b) is mixed with nanoscale inorganic particulate solids d) and condensed by thermal treatment on the surface of the particulate material (surface modification). For this purpose the silane compound b) is preferably heated in the absence of water and with thorough stirring and the particulate material d) in the form of an alcoholic sol with a solids fraction of approximately 30% by weight is added dropwise. Alcoholic sols are available, for example, directly from Nissan Chemical Industries, Ltd as SiO$_2$ in methanol or SiO$_2$ in isopropanol. The mixture is heated for 24 hours with reflux of the alcohol used. The result is a colourless, translucent suspension.

Typical values when using 0.4 mol of APTS and 1.2 mol of SiO$_2$ in isopropanol are a water content of less than 1% by weight and a degree of Si condensation of from 12 to 20% (from 50 to 54% T$^0$, from 39 to 43% T$^1$, from 5 to 9% T$^2$). Lower alcohol formed during the surface modification is removed, together with the alcohol from the suspension, by a subsequent vacuum distillation and can be used again. Typical values from the above example in the case of vacuum distillation with a bath temperature of 40° C. and a final pressure of 40 mbar are from 50 to 54% by weight yield of surface-modified SiO$_2$ (b) having a residual water content of less than 1% by weight and a degree of Si condensation of from 20 to 44% (from 41 to 45% T$^0$, from 45 to 49% T$^1$, from 8 to 12% T$^2$).

Typical additions for use as a spray coating are 1.7 g of solvent per g of component (a) and 0.9 g of solvent per g of component (b), to give a mixing ratio of 3 parts by weight of component (a) to 1 part by weight of component (b).

EXAMPLE 2

Preparation of Component (A)

1147.5 g (4.855 mol) of GPTS were hydrolysed with 654.3 g (36.35 mol) of 0.1 N hydrochloric acid in a 5 l reactor at 20° C. with stirring. After 4 h 22.8554 g (0.0448 mol, 0.92 mol % with respect to GPTS) of 1H,1H,2H,2H- perfluorooctyltriethoxysilane (FTS) and 3000 g of methanol were added to the GPTS hydrolysate to give a clear solution. The homogeneous reaction mixture was stirred for 4 hours before further processing. Starting from 3387.13 g of the reaction mixture, distillative removal was carried out on a rotary evaporator at a water bath temperature of 40° C. at a pressure of up to 75 mbar. The distillation was commenced at a pressure of $p_a$=140 mbar, which was reduced by 20 mbar every hour. The result was 900.57 g of a highly viscous residue (crude component (A)). From the water contents before and after distillation (10.97% by weight and 12.95% by weight) it was calculated that 255.12 g of water had been distilled off as an azeotrope. 255.12 g of distilled water were added with stirring. At room temperature, 190.81 g of butyl glycol were added to 109.28 g of product with stirring.

Synthesis of Component (B)

1160.68 g (6.474 mol) of 3-aminopropyltrimethoxysilane (APTS) were heated to 80° C. in a 6 l reactor in the absence of moisture, with stirring using a KPG stirrer. 3861.00 g of a 30% by weight suspension of $SiO_2$ in isopropanol was added slowly to the heated APTS, dropwise from a dropping funnel, with thorough stirring, the addition taking place over the course of 1 h. Following the addition, the temperature was held at 80° C. for 24 h.

The colourless, translucent reaction mixture was distilled on a rotary evaporator at a water bath temperature of 40° C. at a pressure of up to 40 mbar. The distillation was commenced at a pressure of $p_a$=130 mbar which was lowered by 15 mbar every hour. At room temperature, 35.7 g of butyl glycol and 1911.1 g of 1-butanol were added to 2611.3 g of distillation residue with stirring.

Mixing and Processing of Component (A) and (B)

100 g of component B were added to 300 g of component (A) with stirring. This mixture had a pot life of more than 2 h. Using a gravity-feed cup-type spray gun with a 1.4 mm nozzle and 4 bar air pressure, the mixture was applied to aluminium panels, steel panels painted with white 2K polyurethane paint (2K PU paint, ICI Autocolor Turbo Plus topcoat), marble panels and terracotta tiles, in a wet film thickness of from 25 to 50 µm. The flash-off time was 30 minutes and dryness state 5 was reached after storage at 20° C. for 3 hours. After storage at 20° C. for 48 hours the dryness state was 6. The dry film thickness was from 5 to 10 µm.

The coated substrates were subjected to the following tests:

Cross-Cut Test: EN ISO 2409: 1994

The coating material from Example 2 on the "steel panel with 2K PU topcoat" substrate possessed a cross-cut value of 0 and a tape test value of 1. On the aluminium panel, the coating material from Example 2 was found to have a cross-cut value of 0 and a tape test value of 0.

Wetting Properties

The surface energy of the coating material from Example 2 was determined using test inks (from Arcotec and from Tigres) and was less than 20 $mJ/m^2$. The advancing contact angles for water and hexadecane were determined by the drop method and were 100° for water and 48° for hexadecane.

Taber Abraser Test: Wear Testing DIN 52347 (1000 Cycles, CS10F, 500 g)

The "steel panel with 2K PU topcoat" substrate possessed an abrasion of 2.4 mg/100 cycles. The coating material from Example 2 on the "steel panel with 2K PU topcoat" substrate possessed an abrasion of 0.4 mg/100 cycles.

Scribe-Hardness Test

The scribe hardness (mass load on a Vickers diamond which is moved on the coat under test until a scratch trace visible at 40 times magnification is produced) was <1 g for the "steel panel with 2K PU topcoat" substrate and 4 g for the coating material from Example 2 on the "steel panel with 2K PU topcoat" substrate. In an empirical abrasion test using 00 grade steel wool, the coating material from Example 2 on the "steel panel with 2K PU topcoat" substrate was not visibly scratched, unlike the "steel panel with 2K PU topcoat" substrate.

Felt-Tip Pen Test

Using fibretip pens (3000 black from Edding and red from Herlitz), 1×1 $cm^2$ squares were applied to the "steel panel with 2K PU topcoat" substrate and to the "coating material from Example 2 on steel panel with 2K PU topcoat" substrate and dried at 20° C. for 2 hours. The square was then wiped off with a paper cloth soaked in isopropanol. The traces of the fibretip pens were completely removed optically from the "coating material from Example 2 on steel panel with 2K PU topcoat" substrate, whereas in the case of the "steel panel with 2K PU topcoat" substrate the inward diffusion of dye left blue (Edding 3000) and red (Herlitz red) shadows behind.

Graffiti Test

Solvent-based spray paints based on alkyd resin were used as graffiti paints (from Schell). The spray paints were applied hidingly to the substrates, flashed off for 8 hours and then baked at 50° C. for 48 hours. Cleaning was carried out using a high-pressure cleaner (from Kärcher) with cold water and commercial graffiti cleaner (Spray-out from Ell) and solvents (isopropanol, acetone) in combination with cleaning cloths. Assessment was made by experimenters.

The results are summarized in the following table:

| | Aluminium panel | Steel panel with 2K PU topcoat | Terracotta tile |
|---|---|---|---|
| Substrates without coating from Example 2 | no cleaning with high-pressure cleaner easy cleaning with graffiti cleaner | no cleaning with high-pressure cleaner difficult cleaning with graffiti cleaner visibly severe gloss reduction in 10 cleaning cycles | no cleaning with high-pressure cleaner difficult cleaning with graffiti cleaner residues of graffiti paint remain in indentations |
| Substrates with coating from Example 2 | good cleaning with high-pressure cleaner very easy cleaning with graffiti cleaner | good cleaning with high-pressure cleaner easy cleaning with graffiti cleaner no visible gloss reduction in 10 cleaning cycles | very good cleaning with high-pressure cleaner easy cleaning with graffiti cleaner complete cleaning possible over 10 cycles |

Poster Test

A paste prepared in accordance with the manufacturer's instructions (Metylan Spezial (paste based on methyl cellulose with added synthetic resin) from Henkel) was applied to the marble panel and to the marble panel provided with the coating from Example 2, and a paper poster was stuck on. The posted substrates were dried at 20° C. for 24 hours. Attempts were then made to remove the poster mechanically from the substrates. In the case of the uncoated marble panel, experimenters managed to remove small subsections of the top layer of the poster, and strongly adhering bits of paper remained on the panel. In the case of the coated marble panel, after drying at the paper edges, the poster underwent partial detachment itself and became wavy. Experimenters were able to remove the poster, starting from the wavy part, easily and completely. The experiment was repeated three times from the same side with no change in the result.

What is claimed is:

1. A method for coating a substrate, comprising:
   (i) preparing a self-crosslinking coating composition comprising:
      (a) a first component selected from the group consisting of: (a1) at least one hydrolysable silane containing at least one nonhydrolysable substituent with at least one electrophilic group on the at least one nonhydrolysable substituent, or a pre-condensate thereof, (a2) at least one organic compound containing at least two electrophilic groups, and mixtures of (a1) and (a2),
      (b) a second component selected from the group consisting of: (b1) at least one hydrolysable silane containing at least one nonhydrolysable substituent with at least one nucleophilic group on the at least one nonhydrolysable substituent, or a pre-condensate thereof, (b2) at least one organic compound containing at least two nucleophilic groups, and mixtures of (b1) and (b2), and
      (c) at least one hydrolysable silane containing at least one nonhydrolysable fluorocarbyl group having on average from 2 to 30 fluorine atoms attached to aliphatic carbon atoms separated by at least two atoms from the silicon atom, or a pre-condensate thereof, and
   (ii) applying the composition to a substrate and curing the composition at a temperature below 40° C. to form a coating.

2. The method of claim 1 where the coating composition further comprises an optionally surface-modified nanoscale inorganic particulate solid.

3. The method of claim 1 where the electrophilic group is an epoxy, anhydride, acid halide, or isocyanate group.

4. The method of claim 1 where the nucleophilic group is an amino or hydroxyl group.

5. The method of claim 1 where the first component and the at least one hydrolysable silane containing at least one nonhydrolysable fluorocarbyl group are used in the form of a co-polycondensate.

6. The method of claim 2 where the second component of the coating composition is a hydrolysable aminosilane and the nanoscale inorganic particulate solid has been surface modified with at least part of the aminosilane.

7. The method of claim 2 where the nanoscale inorganic particulate solid has been surface modified with at least part of the at least one hydrolysable silane containing at least one nonhydrolysable fluorocarbyl group.

8. The method of claim 1 where the molar ratio of the electrophilic groups to nucleophilic groups is 5:1 to 1:1.

9. The method of claim 1 where the coating composition comprises, per mole of the first component, from 0.005 to 0.05 mol the at least one hydrolysable silane containing at least one nonhydrolysable fluorocarbyl group or pre-condensate thereof and, if present, from 0.2 to 2.0 mol of nanoscale inorganic particulate solid.

10. A coated substrate prepared by the method of claim 1.

11. A self-crosslinking two-component coating composition, comprising:
   (a) a first component selected from the group consisting of: (a1) at least one hydrolysable silane containing at least one nonhydrolysable substituent with at least one electrophilic group on the at least one nonhydrolysable substituent, or a pre-condensate thereof, (a2) at least one organic compound containing at least two electrophilic groups, and mixtures of (a1) and (a2), and
   (b) a second component selected from the group consisting of: (b1) at least one hydrolysable silane containing at least one nonhydrolysable substituent with at least one nucleophilic group on the at least one nonhydrolysable substituent, or a pre-condensate thereof, (b2) at least one organic compound containing at least two nucleophilic groups, and mixtures of (b1) and (b2),
   at least one of the first and second components further comprising at least one hydrolysable silane containing at least one nonhydrolysable fluorocarbyl group having on average from 2 to 30 fluorine atoms attached to aliphatic carbon atoms separated by at least two atoms from the silicon atom, or a pre-condensate thereof.

12. The self-crosslinking two-component coating composition of claim 11 where at least one of the first and second components further comprises an optionally surface-modified nanoscale inorganic particulate solid.

13. The self-crosslinking two-component coating composition of claim 11 where the electrophilic group is an epoxy, anhydride, acid halide, or isocyanate group.

14. The self-crosslinking two-component coating composition of claim 11 where the nucleophilic group is an amino or hydroxyl group.

15. The self-crosslinking two-component coating composition of claim 11 where the at least one hydrolysable silane containing at least one nonhydrolysable fluorocarbyl group is co-condensed in the first component.

16. The self-crosslinking two-component coating composition of claim 11 where the second component comprises a hydrolysable aminosilane and a nanoscale inorganic particulate solid that has been surface modified with at least part of the aminosilane.

17. The self-crosslinking two-component coating composition of claim 11 where at least one of the first component and the second component further comprise a nanoscale inorganic particulate solid that has been surface modified with at least a part of the at least one hydrolysable silane containing at least one nonhydrolysable fluorocarbyl group.

* * * * *